US012795673B2

(12) United States Patent
Lin et al.

(10) Patent No.: US 12,795,673 B2
(45) Date of Patent: Nov. 10, 2026

(54) METHOD AND DEVICE FOR PHYSICAL UPLINK CONTROL CHANNEL TRANSMISSION

(71) Applicant: SHARP KABUSHIKI KAISHA, Sakai City (JP)

(72) Inventors: Wan-Chen Lin, Taipei (TW); Heng-Li Chin, Taipei (TW); Hai-Han Wang, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 281 days.

(21) Appl. No.: 18/697,590

(22) PCT Filed: Sep. 30, 2022

(86) PCT No.: PCT/CN2022/123634
§ 371 (c)(1),
(2) Date: Apr. 1, 2024

(87) PCT Pub. No.: WO2023/051830
PCT Pub. Date: Apr. 6, 2023

(65) Prior Publication Data

US 2024/0414716 A1 Dec. 12, 2024

Related U.S. Application Data

(60) Provisional application No. 63/251,511, filed on Oct. 1, 2021.

(51) Int. Cl.
*H04W 72/21* (2023.01)

(52) U.S. Cl.
CPC .................................. *H04W 72/21* (2023.01)

(58) Field of Classification Search
None
See application file for complete search history.

(56) References Cited

U.S. PATENT DOCUMENTS

2020/0314664 A1 10/2020 Zhou et al.
2020/0314858 A1* 10/2020 Xu ........................ H04L 5/0094
(Continued)

FOREIGN PATENT DOCUMENTS

WO 2021072619 A1 4/2021
WO 2021142831 A1 7/2021

OTHER PUBLICATIONS

Mediatek Inc, "DraftCR on MAC based spatial relation switch test case in EN-DC", R4-2017177, 3GPP TSG-RAN WG4 Meeting #97-e, Electronic Meeting, Nov. 2-Nov. 13, 2020 (Nov. 13, 2020).

*Primary Examiner* — Suhail Khan
(74) *Attorney, Agent, or Firm* — ScienBiziP, P.C.

(57) ABSTRACT

A method of PUCCH transmission performed by a UE is provided. The method includes receiving, from a BS, a plurality of PUCCH configurations configured for a plurality of cells, a first PUCCH configuration of the plurality of PUCCH configurations including one or more first spatial relation information for a first cell of the plurality of cells, and a second PUCCH configuration of the plurality of PUCCH configurations including one or more second spatial relation information for a second cell of the plurality of cells; receiving, from the BS on a PDSCH, an activation message for activating at least one first spatial relation information or at least one second spatial relation information; and performing a first PUCCH transmission on the first cell by using a first spatial setting corresponding to the at least one first spatial relation information indicated in the activation message.

16 Claims, 14 Drawing Sheets

(56) References Cited

U.S. PATENT DOCUMENTS

| | | | |
|---|---|---|---|
| 2020/0314860 | A1 | 10/2020 | Zhou et al. |
| 2023/0275705 | A1* | 8/2023 | Muruganathan ...... H04L 1/1822 370/329 |

* cited by examiner

<table>
<tr><td>R</td><td colspan="5">Serving Cell ID#0</td><td colspan="2">BWP ID#0</td></tr>
<tr><td>R</td><td colspan="7">PUCCH resource ID</td></tr>
<tr><td>S7</td><td>S6</td><td>S5</td><td>S4</td><td>S3</td><td>S2</td><td>S1</td><td>S0</td></tr>
<tr><td>R</td><td colspan="5">Serving Cell ID#2</td><td colspan="2">BWP ID#1</td></tr>
<tr><td>R</td><td colspan="7">PUCCH resource ID</td></tr>
<tr><td>S7</td><td>S6</td><td>S5</td><td>S4</td><td>S3</td><td>S2</td><td>S1</td><td>S0</td></tr>
</table>

FIG. 5A

| | | | |
|---|---|---|---|
| R | Serving Cell ID#0 | | BWP ID#0 |
| R | PUCCH resource ID | | |
| R | R | Spatial Relation Info ID | |
| R | Serving Cell ID#2 | | BWP ID#1 |
| R | PUCCH resource ID | | |
| R | R | Spatial Relation Info ID | |

FIG. 5B

METHOD AND DEVICE FOR PHYSICAL UPLINK CONTROL CHANNEL TRANSMISSION

CROSS-REFERENCE TO RELATED APPLICATION(S)

The present disclosure is a National Stage Application of International Patent Application Serial No. PCT/CN2022/123634, filed on Sep. 30, 2022, which claims the benefit of and priority to U.S. Provisional Patent Application Ser. No. 63/251,511, filed on Oct. 1, 2021, the contents of all which are hereby incorporated herein fully by reference into the present disclosure for all purposes.

FIELD

The present disclosure is generally related to wireless communications and, more specifically, to a method of physical uplink control channel (PUCCH) transmission and a related device configured to employ the method.

BACKGROUND

With the tremendous growth in the number of connected devices and the rapid increase in user/network traffic volume, various efforts have been made to improve different aspects of wireless communication for the next-generation wireless communication systems, such as the fifth-generation (5G) New Radio (NR) system, by improving data rate, latency, reliability, and mobility.

The 5G NR system is designed to provide flexibility and configurability for optimizing network services and types, and accommodating various use cases, such as enhanced Mobile Broadband (eMBB), massive Machine-Type Communication (mMTC), and Ultra-Reliable and Low-Latency Communication (URLLC).

As the demand for radio access continues to increase, however, there is a need for further improvements in wireless communication in the next-generation wireless communication systems.

SUMMARY

The present disclosure provides a method and a related device for performing physical uplink control channel (PUCCH) transmission.

According to an aspect of the present disclosure, a method for PUCCH transmission performed by a user equipment (UE) is provided. The method includes receiving, from a base station (BS), a plurality of PUCCH configurations for a plurality of cells, a first PUCCH configuration of the plurality of PUCCH configurations including one or more first spatial relation information for a first cell of the plurality of cells, and a second PUCCH configuration of the plurality of PUCCH configurations including one or more second spatial relation information for a second cell of the plurality of cells; receiving, from the BS, on a physical downlink shared channel (PDSCH), an activation message for activating at least one first spatial relation information of the one or more first spatial relation information for the first cell or at least one second spatial relation information of the one or more second spatial relation information for the second cell; and performing a first PUCCH transmission on the first cell by using a first spatial setting corresponding to the at least one first spatial relation information indicated in the activation message.

According to another aspect of the present disclosure, a UE for performing PUCCH transmission is provided. The UE includes at least one processor, and at least one memory coupled to the at least one processor and storing computer-executable instructions that, when executed by the at least one processor, cause the UE to perform the above-disclosed method of PUCCH transmission.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

FIG. 5A and FIG. 5B are diagrams illustrating a PUCCH spatial relation Activation/Deactivation MAC CE for multiple PUCCH carriers, according to an implementation of the present disclosure.

DESCRIPTION

Figure 1:
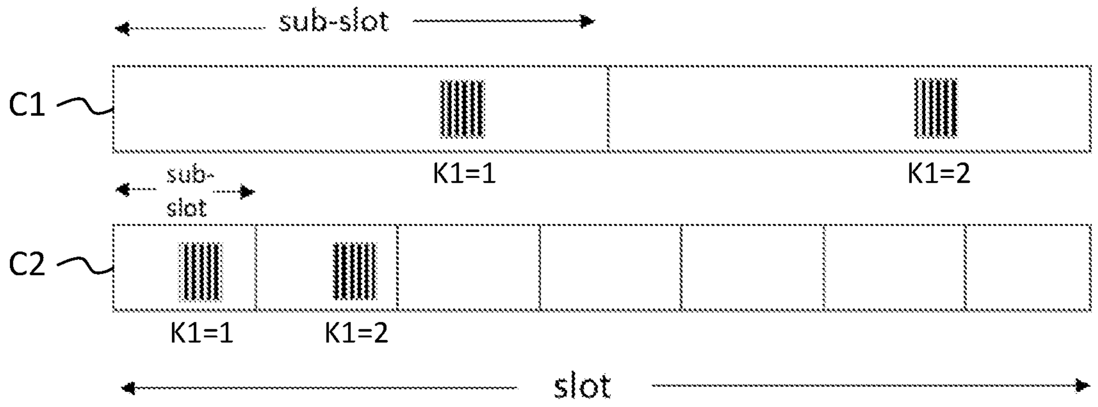
FIG. 1 is a diagram illustrating different sub-slot lengths for different carriers, according to an implementation of the present disclosure.

Some abbreviations used in this disclosure may include the following:

| Abbreviation | Full name |
|---|---|
| 3GPP | $3^{rd}$ Generation Partnership Project |
| 5G | $5^{th}$ generation |
| ACK | Acknowledgment |
| BWP | Band Width Part |
| CC | Component Carrier |
| CE | Control Element |
| C-RNTI | Cell Radio Network Temporary Identifier |
| CS-RNTI | Configured Scheduling Radio Network Temporary Identifier |
| DAI | Downlink Assignment Index |
| DC | Dual Connectivity |
| DCI | Downlink Control Information |
| DL | Downlink |
| FR1 | Frequency Range 1 |
| FR2 | Frequency Range 2 |
| GC-PDCCH | Group Common Physical Downlink Control Channel |
| HARQ | Hybrid Automatic Repeat Request |
| IE | Information Element |
| IIOT | Industrial Internet of Things |
| LSB | Least Significant Bit |
| LTE | Long Term Evolution |
| L1 | Layer 1 |
| MAC | Medium Access Control |
| MCG | Master Cell Group |
| MCS-C-RNTI | Modulation Coding Scheme Cell Radio Network Temporary Identifier |
| MIMO | Multi-input Multi-output |
| MSB | Most Significant Bit |
| NACK | Negative Acknowledgment |
| NDI | New Data Indicator |
| NR | New Radio |
| NW | Network |
| PCell | Primary Cell |
| PSCell | Primary Secondary Cell |
| PBCH | Physical Broadcast Channel |
| PDCCH | Physical Downlink Control Channel |
| PDSCH | Physical Downlink Shared Channel |
| PDU | Protocol Data Unit |
| PHY | Physical |
| PTAG | Primary Timing Advance Group |
| PUCCH | Physical Uplink Control Channel |
| PUCCH-SCell | PUCCH Secondary Cell |
| PUSCH | Physical Uplink Shared Channel |
| RAN | Radio Access Network |
| Re | Release |
| RMSI | Remaining Minimum System Information |
| RNTI | Radio Network Temporary Identifier |
| RRC | Radio Resource Control |
| RV | Redundancy Version |
| SCell | Secondary Cell |
| SCG | Secondary Cell Group |
| SCS | Subcarrier Spacing |
| SFI | Slot Format Indicator |
| SpCell | Special Cell |
| SLIV | Start and Length Indicator Value |
| SPS | Semi-Persistent Scheduling |
| SR | Scheduling Request |
| SRS | Sounding Reference Signal |
| SSB | Synchronization Signal Block |
| STAG | Secondary Timing Advance Group |
| TAG | Timing Advance Group |
| TB | Transport Block |
| TBS | Transport Block Size |
| TCI | Transmission Configuration Indicator |
| TR | Technical Report |
| TS | Technical Specification |
| TX | Transmission |
| UCI | Uplink Control Information |
| UE | User Equipment |
| UL | Uplink |
| UL-SCH | Uplink Shared CHannel |
| URLLC | Ultra Reliable Low Latency Communication |

-continued

| Abbreviation | Full name |
|---|---|
| USS | UE-Specific Search Space |
| WG | Working Group |
| WI | Working Item |
| QCL | Quasi Co-Location |

The following disclosure contains specific information pertaining to exemplary implementations in the present disclosure. The drawings and their accompanying detailed disclosure are directed to exemplary implementations. However, the present disclosure is not limited to these exemplary implementations. Other variations and implementations of the present disclosure will occur to those skilled in the art. Unless noted otherwise, like or corresponding elements in the drawings may be indicated by like or corresponding reference numerals. Moreover, the drawings and illustrations are generally not to scale and are not intended to correspond to actual relative dimensions.

For consistency and ease of understanding, like features are identified (although, in some implementations, not shown) by reference designators in the exemplary drawings. However, the features in different implementations may be different in other respects, and therefore shall not be narrowly confined to what is illustrated in the drawings.

The phrases "in one implementation," and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicate open-ended inclusion or membership in the disclosed combination, group, series, and equivalents.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists, A and B exist at the same time, A and C exist at the same time, B and C exist at the same time, and A, B and C exist at the same time. Further, the character "/" used herein generally represents that the former and latter associated objects are in an "or" relationship.

A UE may be referred to as a PHY/MAC/RLC/PDCP/SDAP/RRC/AS/NAS layer/entity. The PHY/MAC/RLC/PDCP/SDAP/RRC/AS/NAS layer/entity may be referred to as the UE.

A NW may be a network node, a TRP, a cell (e.g., SpCell, PCell, PSCell, and/or SCell), an eNB, a gNB, and/or a base station.

A Serving Cell may be a PCell, a PSCell, or an SCell (Secondary Cell). The serving cell may be an activated or a deactivated serving cell.

SpCell: For a Dual Connectivity operation, the term Special Cell refers to the PCell of the MCG or the PSCell of the SCG depending on whether the MAC entity is associated with the MCG or the SCG, respectively. Otherwise, the term Special Cell refers to the PCell.

The terms "initiate", "trigger", "apply", "store", and "start" may be interchangeably used in some implementations of the present disclosure.

The terms "terminate", "stop", "release", "suspend", "discard", "end", "complete", "abort", and "cancel" may be interchangeably used in some implementations of the present disclosure.

The terms "period", "process", "phase", and "duration" may be interchangeably used in some implementations of the present disclosure.

The terms "resource" and "occasion" may be interchangeably used in some implementations of the present disclosure.

The terms "ongoing", "running", and "pending" may be interchangeably used in some implementations of the present disclosure.

The terms "mechanism", "scheme", and "functionality" may be interchangeably used in some implementations of the present disclosure.

The terms "mapped to" and "associated with" may be interchangeably used in some implementations of the present disclosure.

Additionally, any two or more of the following paragraphs, (sub)-bullets, points, actions, behaviors, terms, alternatives, examples, or claims in the present disclosure may be combined logically, reasonably, and properly to form a specific method. Any sentence, paragraph, (sub)-bullet, point, action, behavior, term, or claim in the present disclosure may be implemented independently and separately to form a specific method. Dependency, e.g., "based on", "more specifically", "preferably", "in one embodiment", "in one implementation", "in one alternative", in the present disclosure may refer to just one possible example that would not restrict the specific method.

For a non-limiting explanation, specific details, such as functional entities, techniques, protocols, standards, and the like, are set forth for providing an understanding of the disclosed technology. In other examples, detailed disclosure of well-known methods, technologies, systems, and architectures are omitted so as not to obscure the present disclosure with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may include computer-executable instructions stored on a computer-readable medium, such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Application-Specific Integrated Circuits (ASICs), programmable logic arrays, and/or one or more Digital Signal Processors (DSPs). Although some of the disclosed implementations are directed to software installed and executing on computer hardware, nevertheless, alternative implementations as firmware, as hardware, or as a combination of hardware and software are well within the scope of the present disclosure.

The computer-readable medium may include, but may not be limited to, Random Access Memory (RAM), Read-Only Memory (ROM), Erasable Programmable Read-Only Memory (EPROM), Electrically Erasable Programmable Read-Only Memory (EEPROM), flash memory, Compact Disc (CD) Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, an LTE-Advanced Pro system, or a New Radio (NR) system) may typically include at least one base station (BS), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an internet) via a Radio Access Network (RAN) established by one or more BSs.

A UE, according to the present disclosure, may include, but is not limited to, a mobile station, a mobile terminal or device, or a user communication radio terminal. For example, a UE may be a portable radio equipment that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) according to basic Wideband-Code Division Multiple Access (W-CDMA), High-Speed Packet Access (HSPA), LTE, LTE-A, enhanced LTE (eLTE), NR (often referred to as 5G), and/or LTE-A Pro. However, the scope of the present disclosure is not limited to these protocols.

The BS may be operable to provide radio coverage to a specific geographical area using multiple cells forming the RAN. The BS may support the operations of the cells. Each cell may be operable to provide services to at least one UE within its radio coverage. More specifically, each cell (often referred to as a serving cell) may provide services to one or more UEs within its radio coverage (e.g., each cell schedules the downlink (DL) and optionally UL resources to at least one UE within its radio coverage for DL and optionally UL packet transmissions). The BS may communicate with one or more UEs in the radio communication system via the plurality of cells.

A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called a Special Cell (SpCell). A Primary Cell (PCell) may include the SpCell of an MCG. A Primary SCG Cell (PSCell) may include the SpCell of an SCG. MCG may include a group of serving cells associated with the Master Node (MN), including the SpCell and optionally one or more Secondary Cells (SCells). An SCG may include a group of serving cells associated with the Secondary Node (SN), including the SpCell and optionally one or more SCells.

As described above, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3rd Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are applicable in NR: (1) the low-density parity-check (LDPC) code, and (2) the polar code. The coding scheme adaptation may be configured based on the channel conditions and/or the service applications.

Moreover, in a transmission time interval of a single NR frame, at least DL transmission data, a guard period, and UL transmission data should be included. The respective portions of the DL transmission data, the guard period, and the UL transmission data should also be configurable, for example, based on the network dynamics of NR. An SL resource may also be provided via an NR frame to support ProSe services or V2X services.

PUCCH

In the 3GPP NR Rel-15 and Rel-16 specification, the NW configures a PUCCH configuration at least on a non-initial BWP for an SpCell and a PUCCH SCell. A PUCCH SCell refers to an SCell that is configured with a PUCCH. If a PUCCH SCell is supported by the UE, the NW may configure at most one additional SCell of a cell group (e.g., MCG or SCG) with a PUCCH configuration. APUCCH configuration may be configured for one BWP of a normal UL or Supplementary Uplink (SUL) of a serving cell. If the UE is configured with an SUL, the NW configures a PUCCH only on the BWPs of one of the uplinks (e.g., a normal UL or SUL). In other words, a PUCCH may be transmitted on one serving cell in a PUCCH cell group. If the UE is configured with a PUCCH-SCell, the UE may apply the corresponding PUCCH transmission for both primary PUCCH group and secondary PUCCH group. Furthermore, the NW may configure an index of the serving cell of the same cell group to use for a PUCCH using a field (e.g., “pucch-Cell”) in the “PDSCH-ServingCellConfig”. If the field “pucch-Cell” is absent, the UE sends a HARQ feedback on the PUCCH of the SpCell of the cell group, or on the serving cell, if the serving cell is a PUCCH SCell. It should be noted that a PUCCH cell may include the cell where a PUCCH is transmitted. Besides, the UCI types reported in a PUCCH may include HARQ-ACK information, SR, Link Recovery Request (LRR), and CSI. It should be noted that a carrier may include a cell, or a supplemental uplink carrier.

PUCCH resources may include configured PUCCH resources and scheduled PUCCH resources. It should be noted that the configured PUCCH resources may include resources without a dynamic indication (e.g., PUCCH Resource Indicator (PRI) in a DCI), for example, PUCCH resources for SR, CSI, and SPS PDSCH HARQ-ACK. On the other hand, the scheduled PUCCH resources may include resources indicated by the DCI, for example, PUCCH resources for PDSCH HARQ-ACK.

Numerologies

In the 3GPP NR specification, multiple numerologies are supported, as shown in Table 1 below. Table 1 illustrates that cyclic prefixes for a downlink or uplink BWP are obtained from the higher layer parameters, such as the “subcarrierSpacing” parameter and the “cyclicPrefix” parameter, respectively.

TABLE 1

| Cyclic Prefix | | |
|---|---|---|
| μ | $\Delta f = 2^{\mu} \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |

URLLC

In the 3GPP Rel-15 NR specification, the URLLC has been introduced with Transmission Time Interval (TTI) structures for a low latency, as well as methods for improved reliability. The enhancement includes introducing a new RNTI (e.g., MCS-C-RNTI) to enable a more reliable coding scheme. In the NR specification Rel-16, further enhancements are introduced to reduce latency and to enhance reliability. For example, the PDCCH enhancements introduce a span pattern within a slot, and DCI formats with smaller payload sizes (e.g., DCI format 0-2 and DCI format 1-2). The UCI enhancements enable more than one HARQ-ACK codebook within a slot, UCIs (or PUCCH) corresponding to different priorities, two PUCCH configurations, and SPS only HARQ-ACK codebook. The PUSCH enhancements enable non-slot based PUSCH repetitions. The inter-UE prioritization enables the transmission of higher priority to be prioritized. Multiple active configured grant configurations and SPS configurations per BWP provide a lower latency and more flexible semi-persistent scheduling.

PUCCH Configuration

If a UE has a dedicated PUCCH resource configuration, the UE is provided by a higher layer with one or more PUCCH resources via a “PUCCH-Config” or a “PUCCH-ConfigList” per BWP. The PUCCH configuration provides information for PUCCH resource set index, PUCCH resource index, PUCCH format (e.g., short format or long format), timing for given downlink data to HARQ-ACK, sub-slot length for PUCCH, the spatial relation between a reference signal and PUCCH, and frequency hopping. On the other hand, if a “PUCCH-ConfigList” is configured, two simultaneously constructed HARQ-ACK codebooks are configured for a UE. More specifically, a first HARQ-ACK codebook is associated with a PUCCH of a priority index 0 (e.g., a low priority) and a second HARQ-ACK codebook is associated with a PUCCH of a priority index 1 (e.g., a high priority).

Terminology

A UE may be referred to as a Physical Layer (PHY), a Medium Access Control (MAC), a Radio Link Control (RLC), a Packet Data Convergence Protocol (PDCP), or a Service Data Adaptation Protocol (SDAP). The PHY/MAC/RLC/PDCP/SDAP layer/entity may be referred to as the UE.

A network (NW) may be a network node, a Transmission/Reception Point (TRP), a cell (e.g., Special Cell (SpCell), Primary Cell (PCell), Primary SCell (PSCell), and/or Secondary Cell (SCell)), an eNB, a gNB, and/or a base station.

A Serving Cell may be a PCell, a PSCell, or an SCell. The serving cell may be an activated or a deactivated serving cell.

SpCell: For a Dual Connectivity operation, the term Special Cell refers to the PCell of the MCG or the PSCell of the SCG depending on whether the MAC entity is associated with the MCG or the SCG, respectively. Otherwise, the term Special Cell refers to the PCell. A Special Cell supports the PUCCH transmission and contention-based Random Access, and is always activated.

Since only few UL symbols are available to transmit the HARQ-ACK information in a TDD configuration, a low latency requirement may not be met in the URLLC scenario. Although different serving cells may have different UL/DL patterns in a TDD configuration, a PUCCH may only be transmitted on a PCell in a PUCCH cell group including the PCell or on a configured serving cell (e.g., a PUCCH SCell) in a PUCCH cell group not including the PCell. However, such a PUCCH transmission may lead to long latency due to a lack of available UL resource for the PUCCH transmission. To avoid the long latency, a PUCCH carrier (e.g., a carrier with PUCCH transmission) may be switched to schedule the UL resources adequately. In other words, the PUCCH carrier switching enables a PUCCH to be transmitted on other serving cells when there is no available resource on a PCell or a PUCCH SCell. The other serving cells on which the PUCCH may be transmitted may be referred to as PUCCH cells hereinafter. Furthermore, the PUCCH carrier switching may be dynamically indicated, or semi-statically configured, to the UE. More specifically, a dynamic indication for the PUCCH carrier switching may include a specific field in a DCI format to indicate a target PUCCH carrier, and a semi-static configuration for the PUCCH carrier switching may include a PUCCH carrier timing pattern to specify a target PUCCH carrier for each slot.

Different PUCCH Configurations for Different PUCCH Carriers

Since a PUCCH configuration is configured per BWP, information included in each PUCCH configuration may not be the same. When a UE is configured with PUCCH carrier switching, PUCCH resources indicated by a misaligned PUCCH configuration may lead to ambiguity. For example, if an initial PUCCH carrier (e.g., a carrier before switching) and a target PUCCH carrier (e.g., a carrier after switching) is configured with different number of PUCCH configurations, the priorities of PUCCH transmissions on a target PUCCH carrier may be specified. Besides, if an initial PUCCH carrier and a target PUCCH carrier are configured with different sub-slot configurations, the corresponding HARQ-ACK timing (e.g., represented as K1) and PUCCH repetition for different carriers (e.g., an initial PUCCH carrier and a target PUCCH carrier) may be specified.

FIG. 1 is a diagram illustrating different sub-slot lengths for different carriers, according to an implementation of the present disclosure. As shown in FIG. 1, the carriers C1 and C2 with different sub-slot lengths may apply the same K1 value. For example, the carrier C1 in the first sub-slot (with a longer length) and the carrier C2 in the first sub-slot (with a shorter length) may both apply K1=1, and the carrier C1 in the second sub-slot (with a longer length) and the carrier C2 in the second sub-slot (with a shorter length) may both apply K1=2.

Figure 2:
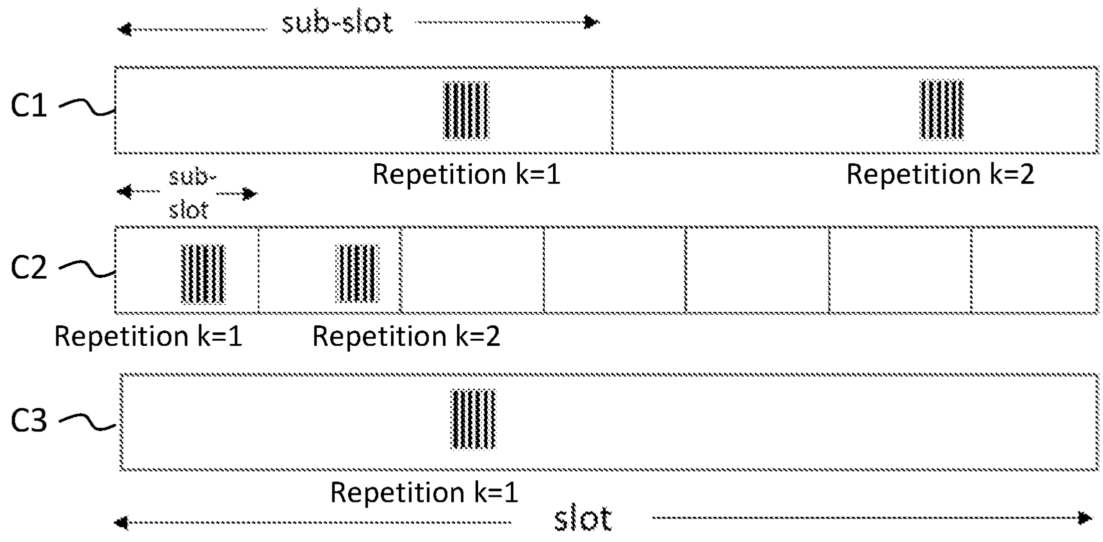
FIG. 2 is a diagram illustrating PUCCH repetitions on different carriers, according to an implementation of the present disclosure.

FIG. 2 is a diagram illustrating PUCCH repetitions on different carriers, according to an implementation of the present disclosure. As shown in FIG. 2, different carriers may be configured with different sub-slot configurations and different PUCCH configurations (e.g., PUCCH repetitions). For example, PUCCH repetitions (e.g., Repetition k=1 and Repetition k=2) are transmitted on each of the carriers C1-C3 in each sub-slot.

Figure 3:
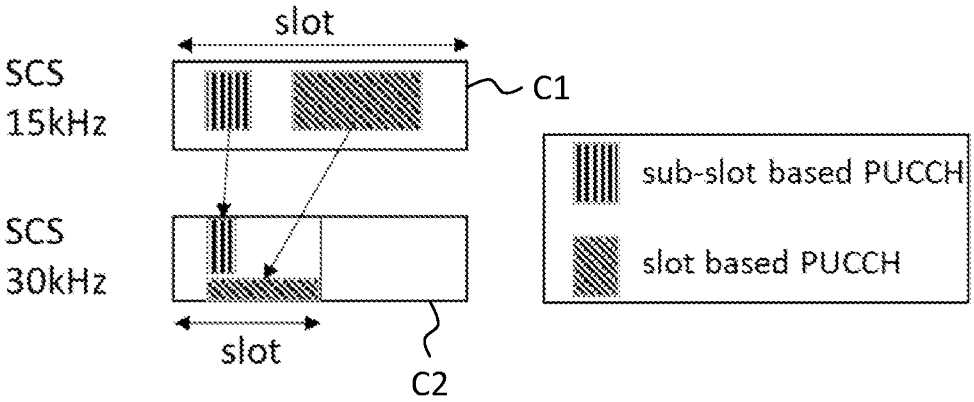
FIG. 3 is a diagram illustrating non-overlapping PUCCHs on an initial PUCCH carrier resulting in overlapping PUCCHs on a target PUCCH carrier, according to an implementation of the present disclosure.

FIG. 3 is a diagram illustrating non-overlapping PUCCHs on an initial PUCCH carrier resulting in overlapping PUCCHs on a target PUCCH carrier, according to an implementation of the present disclosure. As shown in FIG. 3, non-overlapping PUCCH resources on an initial PUCCH carrier C1 may result in overlapping PUCCH resources on target PUCCH carrier C2 when carriers C1 and C2 are configured with different SCSs (e.g., 15 kHz and 30 kHz) or with different PUCCH configurations (e.g., sub-slot based PUCCH and slot based PUCCH), and thus handling of dropping and multiplexing between overlapping PUCCHs should be further specified.

Spatial Relation Information for PUCCH

If a UE is configured with a single value for the PUCCH spatial relation information (e.g., PUCCH-SpatialRelationInfo), a spatial setting for a PUCCH may be provided to the UE, for example, by a higher layer parameter in a PUCCH configuration. Otherwise, the UE may determine a spatial setting for a PUCCH via a MAC CE. The UE transmits the PUCCH by using the same spatial domain filter as a reception of a SS/PBCH block, CSI-RS, or a transmission of an SRS. However, if the spatial setting is not indicated, to the UE, by either a higher layer parameter or a MAC CE, the spatial setting for a PUCCH transmission from the UE may be the same as a spatial setting for a PDCCH reception by the UE in the CORESET with the lowest identity (ID) on the active DL BWP of the PCell.

If multiple values for PUCCH-SpatialRelationInfo are configured for both the initial PUCCH carrier and the target PUCCH carrier, the configured spatial relation information (e.g., in the PUCCH-SpatialRelationInfo) may be activated by a MAC CE (e.g., a PUCCH spatial relation Activation/Deactivation MAC CE) after a UE transmits a PUCCH with an ACK value in response to a PDSCH providing the PUCCH-SpatialRelationInfo for an indicated carrier (e.g., a target carrier). However, when the PUCCH carrier switching is indicated between a PDSCH reception and a PUCCH transmission, the configured spatial relation information for the indicated carrier (e.g., a target carrier) may not be activated successfully. As such, how the UE applies the configured spatial relation information during a PUCCH carrier switching should be specified.

Figure 4:
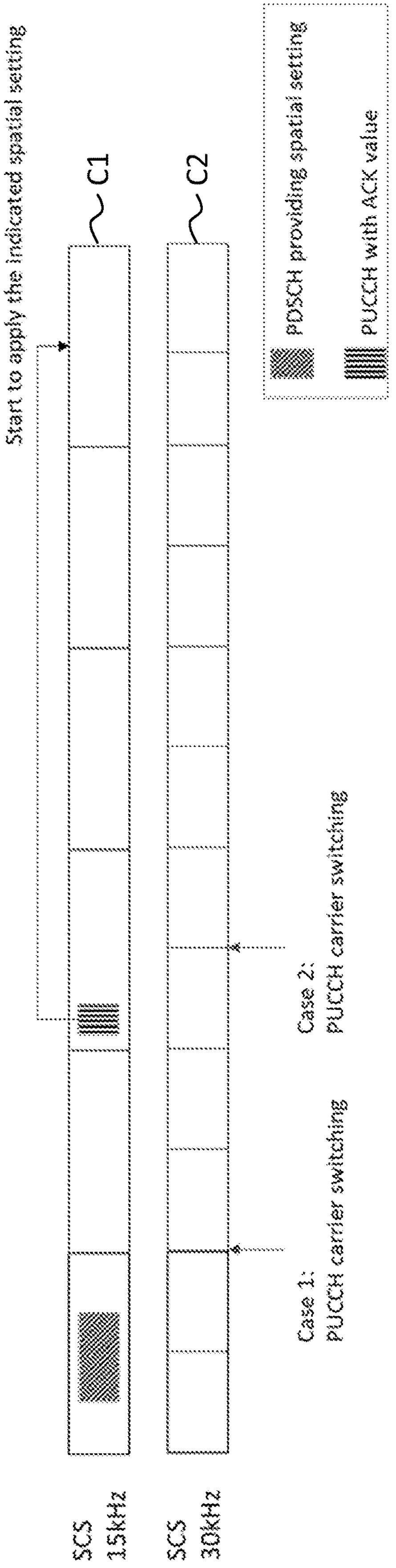
FIG. 4 is a diagram illustrating a spatial setting for PUCCH carrier switching, according to an implementation of the present disclosure.

FIG. 4 is a diagram illustrating two cases for a spatial setting for PUCCH carrier switching, according to an implementation of the present disclosure. In case 1, the UE is indicated to switch the PUCCH carrier (e.g., from PUCCH carrier C1 to PUCCH carrier C2) after receiving the PDSCH that provides the PUCCH-SpatialRelationInfo (e.g., spatial setting) for an initial PUCCH carrier. In case 1, how an indicated carrier (e.g., a target carrier) is indicated in the corresponding MAC CE should be specified. In case 2, the UE is indicated to switch the PUCCH carrier after transmitting the PUCCH with an ACK value in response to the PDSCH that provides the PUCCH-SpatialRelationInfo for a target PUCCH carrier. In case 2, a spatial setting for a target PUCCH carrier should be specified.

In some implementations, a PUCCH spatial relation Activation/Deactivation MAC CE may include one or more fields to indicate spatial relation information for the candidate PUCCH carriers when the PUCCH carrier switching, as mentioned in case 1 and case 2, occurs.

In some implementations, a default spatial setting for candidate PUCCH carriers may be predefined in the UE.

In some implementations, a UE may not expect to be configured with multiple values for PUCCH-SpatialRelationInfo for the candidate PUCCH carriers.

In some implementations, spatial relation information indicated for the PUCCHs on an initial PUCCH carrier may be applied to the PUCCHs on a target PUCCH carrier based on one or more conditions.

In some implementations, a UE may not expect to switch the PUCCH carrier after receiving a PDSCH that provides the PUCCH-SpatialRelationInfo on an initial PUCCH carrier.

In some implementations, a UE may not expect to switch the PUCCH carrier, on an initial PUCCH carrier, in the duration between a slot k where the UE transmits a PUCCH with HARQ-ACK information (e.g., with ACK value) corresponding to a PDSCH reception that provides the PUCCH-SpatialRelationInfo and a slot $k+3 \cdot N_{slot}^{subframe,\mu}$.

In some implementations, if a PUCCH carrier switching indication is received by a UE in a specific duration, the UE may transmit a PUCCH, on a target PUCCH carrier, with HARQ-ACK information (e.g., with ACK value) corresponding to a PDSCH reception that provides the PUCCH-SpatialRelationInfo.

In some implementations, PUCCH carrier switching may not be indicated/enabled/configured if multiple values for PUCCH-SpatialRelationInfo are configured for the candidate PUCCH carriers.

In some implementations, PUCCH carrier switching may not be indicated/enabled/configured for a specific duration if multiple values for PUCCH-SpatialRelationInfo are configured for the candidate PUCCH carriers.

Figure 12:
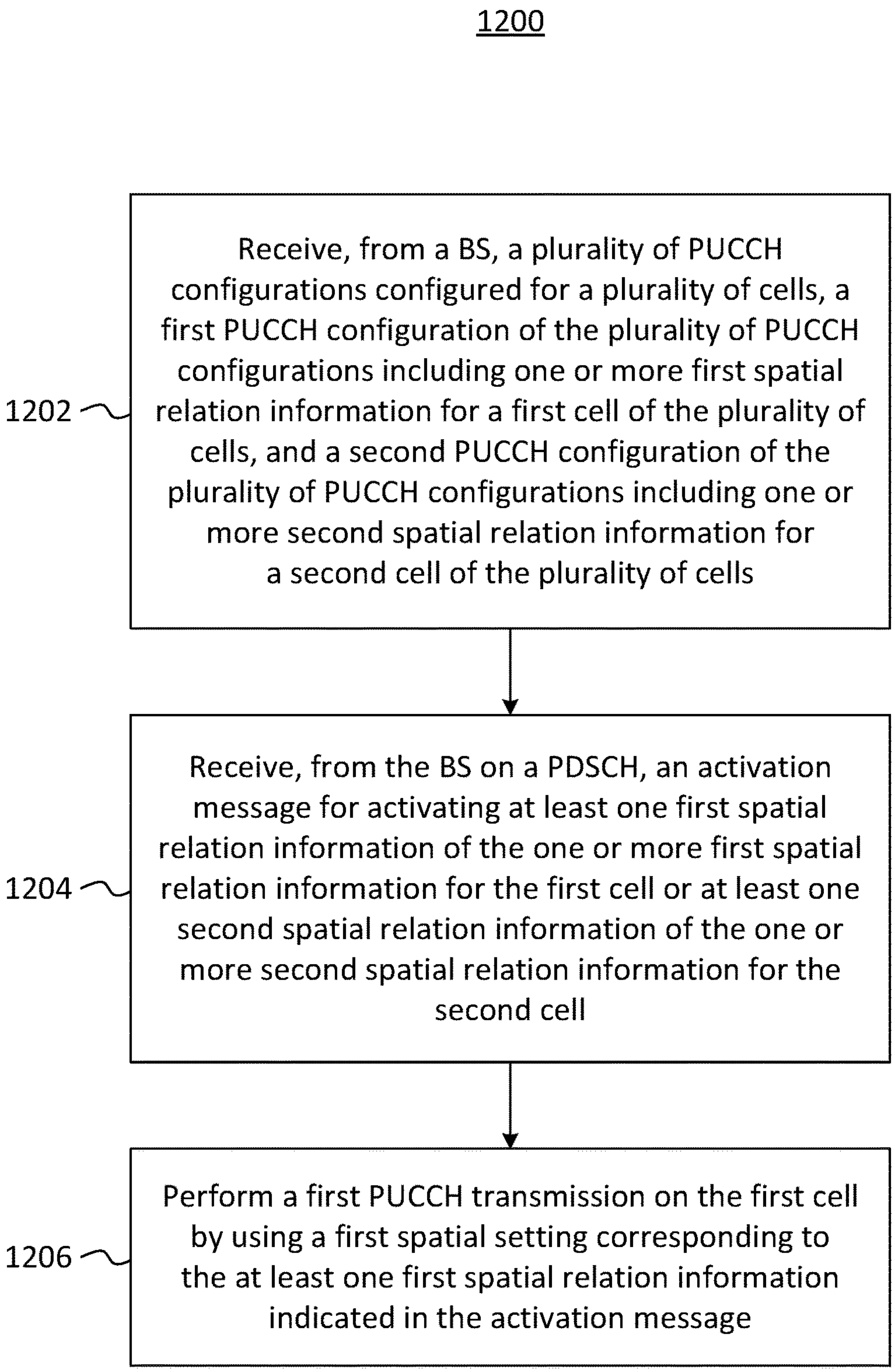
FIG. 12 is a flowchart illustrating a method/process for PUCCH transmission, according to an implementation of the present disclosure.

In a case that a UE is indicated that a PUCCH carrier switching is configured with multiple PUCCH configurations, and multiple spatial relation information are configured to a target PUCCH carrier, the UE may perform the following actions described in FIG. 12.

FIG. 5A and FIG. 5B are diagrams illustrating a PUCCH spatial relation Activation/Deactivation MAC CE for multiple PUCCH carriers, according to an implementation of the present disclosure. As shown in FIGS. 5A and 5B, a PUCCH spatial relation Activation/Deactivation MAC CE (e.g., activation message) may be expanded to include one or more fields (e.g., BWP ID, Serving Cell ID, PUCCH resource ID and Spatial Relation Info ID) to indicate spatial relation information for candidate PUCCH carriers.

In some Implementations, the spatial relation information for each cell may be independently indicated in a corresponding PUCCH spatial relation activation/deactivation MAC CE.

In some implementations, as shown in FIG. 5B, the one or more fields may include BWP IDs (e.g., BWP ID #0, BWP ID #1) of other cells (cells other than an initial PUCCH carrier), more than one serving cell ID (e.g., Serving Cell ID #0, Serving Cell ID #2, etc.), and a spatial relation information ID (e.g., Spatial Relation Info ID) for at least one candidate cell (e.g., a target cell). For example, a Spatial Relation Info ID may be specifically indicated as activated for a serving cell (e.g., Serving Cell ID #0 and Serving Cell ID #2).

In some implementations, an indication may be used to indicate whether the number of serving cell IDs/BWP IDs/spatial relation info IDs included in a PUCCH spatial relation Activation/Deactivation MAC CE is greater than 1.

In some implementations, the indication may be included in the leftmost bit in Octet 1 or Octet 2 of the PUCCH spatial relation Activation/Deactivation MAC CE. The network may set the indication to a first value (e.g., 0) to indicate that the PUCCH spatial relation Activation/Deactivation MAC CE includes only one serving cell ID/BWP ID/spatial relation info ID. Conversely, the network may set the indication to a second value (e.g., 1) to indicate that the PUCCH spatial relation Activation/Deactivation MAC CE includes only one serving cell ID/BWP ID/spatial relation info ID is greater than 1.

In some implementations, a PUCCH spatial relation Activation/Deactivation MAC CE that includes more than 1 serving cell IDs/BWP IDs/spatial relation info IDs and a serving cell IDs/BWP IDs/spatial relation info ID that includes only 1 serving cell ID/BWP ID/spatial relation info ID may be identified by different LCIDs.

In some implementations, the spatial relation information configured in the PUCCH-Config for an initial PUCCH carrier may be used to indicate the spatial relation information for a target PUCCH carrier. More specifically, the field of spatial relation information included in the PUCCH spatial relation activation/deactivation MAC CE may include candidate PUCCH carriers included in PUCCH-SpatialRelationInfoId in a PUCCH-Config for an initial PUCCH carrier. In some implementations, the spatial relation information included in the PUCCH spatial relation activation/deactivation MAC CE may include a corresponding index. More specifically, the corresponding index may include the index of the spatial relation information. In some implementations, the spatial relation information included in the PUCCH spatial relation activation/deactivation MAC CE may include the activation status of the spatial relation information. For example, there may be at most 8 fields (e.g., represented by S0-S7, as shown in FIG. 5A) for indicating the activation status (e.g., '1' represent activation, and '0' represent deactivation) for spatial relation information with Spatial Relation Info ID. Specifically, Si may include the first configured spatial relation information with PUCCH-SpatialRelationInfoId which may be equal to i+1 in the PUCCH-Config (i=0, 1, . . . , 7).

In some implementations, if spatial relation information configured to an initial carrier is the same as that of a target PUCCH carrier, no additional spatial relation information field may be included in the PUCCH spatial relation activation/deactivation MAC CE for a target PUCCH carrier.

In some Implementations, spatial relation information may be indicated to all the carriers of a cell group. The cell group may be referred to as an MCG or an SCG.

In some implementations, the serving cell field included in the PUCCH spatial relation Activation/Deactivation MAC CE may include a cell group.

In some implementations, spatial relation information may be indicated to all the carriers of a group.

In some implementations, the network may configure a group, that includes one or more carriers, to a UE by providing the mapping between the group and the one or more carriers. The configuration may be included in the RRC signaling (e.g., an RRCReconfiguration message).

In some implementations, a group that includes one or more carriers may be preconfigured in the UE.

In some implementations, a PUCCH spatial relation Activation/Deactivation MAC CE may include one or more fields to indicate spatial relation information for the group. The UE may, upon reception of the MAC CE, apply the indicated spatial relation information for all the carriers of the group.

In some implementations, the group may be configured for PUCCH carrier switching and the carrier included in the group may include at least one candidate PUCCH carrier.

In some implementations, the same parameter, e.g., spatialRelationInfo, may be included in the PUCCH-Config for each cell in the same group.

In some implementations, more than one group may be configured.

In some implementations, a default spatial relation setting for the candidate PUCCH carriers may be configured/defined in a UE.

In some implementations, a default spatial relation may include spatial relation information indicated for an initial PUCCH carrier. Hence, after switching to a target PUCCH carrier, the UE may continue applying the spatial relation information indicated for an initial PUCCH carrier.

In some implementations, a UE may continue applying the spatial relation information indicated for the (activate BWP of the) initial PUCCH carrier after performing the PUCCH carrier switching to a target PUCCH carrier based on whether the (active BWP of the) target PUCCH carrier has been indicated (to activate) a spatial relation information.

If the (active BWP of the) target PUCCH carrier has not yet been indicated to activate the spatial relation information, the UE may continue applying the spatial relation information indicated for an initial PUCCH carrier.

If the (active BWP of the) target PUCCH carrier has been indicated to activate the spatial relation information, the UE may not apply the spatial relation information indicated to the (active BWP of the) initial PUCCH carrier. The UE may apply the spatial relation information that has been indicated (to activate) at the (active BWP of the) target PUCCH carrier.

In some implementations, a default spatial relation information may be the same as a spatial setting for PDCCH receptions in the CORESET with the lowest/highest ID on the active BWP of an initial PUCCH carrier.

In some implementations, a default spatial relation information may be the same as a spatial setting for PDCCH receptions in the CORESET with the lowest/highest ID on the active BWP of a target PUCCH carrier.

In some implementations, a default spatial relation information may be explicitly configured via the RRC layer (e.g., on a per BWP basis). For example, the network may configure a specific PUCCH spatial relation Information ID (e.g., SpatialRelationInfoId) to be a default spatial relation information in a "PUCCH-Config" IE. When a UE switches to a target PUCCH carrier, the UE may apply the default spatial relation that is configured at the activated BWP at a target PUCCH carrier (e.g., configured in the PUCCH-Config of the activated BWP).

In some implementations, a default spatial relation information may be referred to as the spatial relation information with the lowest/highest spatial relation information ID (e.g., SpatialRelationInfoId) at the (activated BWP of the) target PUCCH carrier.

In some examples, the UE may not be expected to switch to a target PUCCH carrier if the (BWP to be activated at the) target PUCCH carrier does not have an active spatial relation information (e.g., when multiple PUCCH spatial relation information are configured at a target PUCCH carrier).

In some examples, a UE may not be expected to be configured with multiple values for PUCCH-SpatialRelationInfo for the candidate PUCCH carriers.

In some implementations, the spatial relation information indicated to the PUCCHs on an initial PUCCH carrier may be applied to the PUCCHs on a target PUCCH carrier based on one or more conditions.

In some implementations, the conditions may be based on a switching timing, the type of switching (e.g., dynamic or semi-static), and the UE capability. In some implementations, the switching time may be earlier than a specific time.

In some examples, a UE may not expect to switch a PUCCH carrier on an initial PUCCH carrier after receiving a PDSCH reception that provides the PUCCH-SpatialRelationInfo.

In some examples, a UE may not expect to switch the PUCCH carrier on an initial PUCCH carrier between a slot k where the UE transmits a PUCCH with the HARQ-ACK information (e.g., with ACK value) corresponding to a PDSCH reception that provides the PUCCH-SpatialRelationInfo and a slot $k+3\cdot N_{slot}^{subframe,\mu}$.

In some implementations, if a PUCCH carrier switching indication is received in a specific duration, a UE may transmit a PUCCH, on a target PUCCH carrier, with the HARQ-ACK information (e.g., with ACK value) corresponding to a PDSCH reception that provides the PUCCH-SpatialRelationInfo.

In some implementations, a spatial setting may apply the indicated spatial relation information for an initial PUCCH carrier.

In some implementations, if a first cell indicated by a MAC CE is different from a second cell where the PUCCH is transmitted, the second cell may be further indicated.

In some implementations, the PUCCH carrier switching may not be indicated/enabled/configured if multiple values for the PUCCH-SpatialRelationInfo are configured for candidate PUCCH carriers.

In some implementations, the PUCCH carrier switching may not be indicated/enabled/configured for a specific duration if multiple values for PUCCH-SpatialRelationInfo are configured for the candidate PUCCH carriers.

In some implementations, the specific duration may be a number of symbols/sub-slots/slots after the UE receives a PDSCH reception that provides the PUCCH-SpatialRelationInfo.

In some implementations, the specific duration may be a number of symbols/sub-slots/slots after the UE transmits a PUCCH with HARQ-ACK information (e.g., with ACK value) corresponding to a PDSCH reception that provides the PUCCH-SpatialRelationInfo.

In some implementations, the serving cell included in the PUCCH Spatial relation Activation/Deactivation MAC CE may be the same as the cell that transmits the PUCCH with HARQ-ACK information corresponding to a PDSCH reception that provides the PUCCH-SpatialRelationInfo.

Misaligned PUCCH Configuration

In some implementations, if the PUCCH carrier switching is indicated/configured/enabled, one or more PUCCH parameters or PUCCH configurations may be the same for each candidate carrier. Some examples of the parameters may include a sub-slot configuration, the number of PUCCH-Config, PUCCH-ConfigurationList, dl-DataToUL- ACK-DCI-1-2-r16, dl-DataToUL-ACK-r16, sps-PUCCH-AN-List, spatialRelationInfoToAddModListSizeExt, spatialRelationInfoToAddModListExt, and PUCCH-FormatConfig.

In some implementations, if the PUCCH carrier switching is indicated/configured/enabled, a UE may not expect to be configured with different PUCCH parameters/configurations from different carriers.

In some implementations, if one or more misaligned PUCCH configurations exist, a UE may not expect to be indicated with the PUCCH carrier switching.

In some implementations, non-overlapping PUCCHs within a slot/sub-slot on an initial PUCCH carrier may result in non-overlapping PUCCHs/PUSCHs within a slot/sub-slot on a target PUCCH carrier.

In some implementations, non-overlapping PUCCHs/PUSCHs within a slot/sub-slot on an initial PUCCH carrier may expect to be overlapping on a target PUCCH carrier when one or more conditions are satisfied.

In some implementations, the priority of the overlapping PUCCHs on an initial PUCCH carrier may be the same as that of a target PUCCH carrier.

In some implementations, the number of symbols per sub-slot configured for an initial PUCCH carrier may be lower or higher than that of candidate PUCCH carriers.

In some implementations, the UE may determine the PUCCH resource set on a target PUCCH carrier based on the total number of UCI information bits within a slot/sub-slot on an initial PUCCH carrier.

In some implementations, a first PUCCH on an initial PUCCH carrier may expect to be switched to a second PUCCH or a PUSCH on a target PUCCH carrier that is no later or no earlier than the first PUCCH.

In some implementations, some offset values may be used to adjust the PUCCH configurations among different carriers.

In some implementations, if misaligned PUCCH configurations exist, one or more offset values may be added to the number of bits of the UCI for the UE to determine the PUCCH resource set.

In some implementations, if misaligned PUCCH configurations for a HARQ-ACK codebook only for a SPS PDSCH exist, more than one SPS HARQ-ACK information bits may be appended to HARQ-ACK information bits for a PDSCH reception.

In some implementations, if a target PUCCH carrier is not configured with one or more PUCCH parameters/configurations, a UE may ignore the PUCCH carrier switching indication and determine to transmit PUCCHs on an initial PUCCH carrier.

In some implementations, if the PUCCH carrier switching is indicated/configured/enabled, a UE may expect to switch the carrier based on one or more conditions.

In some implementations, some configured PUCCH parameters/configurations may be dynamically changed.

In some implementations, if the PUCCH carrier switching is enabled/indicated/configured, some parameters or configurations may be configured for a PUCCH.

In some implementations, a first BWP may correspond to an initial PUCCH carrier, a second BWP may correspond to a target PUCCH carrier, and all other BWPs may correspond to other candidate PUCCH carriers.

In some implementations, the NW may include the following configurations/parameters for one or more than one indicated/candidate PUCCH carriers in the same order, with the same value, or the same number of entries.

In some implementations, the NW may set the following configurations/parameters to be the same for each UL BWP/cell. The configurations/parameters may include:

1. subslotLengthForPUCCH-r16:

In some implementations, if the subslotLengthForPUCCH-r16 is configured to the first BWP, the subslotLengthForPUCCH-r16 may be configured to the second BWP and/or all other BWPs as well.

Figure 6:
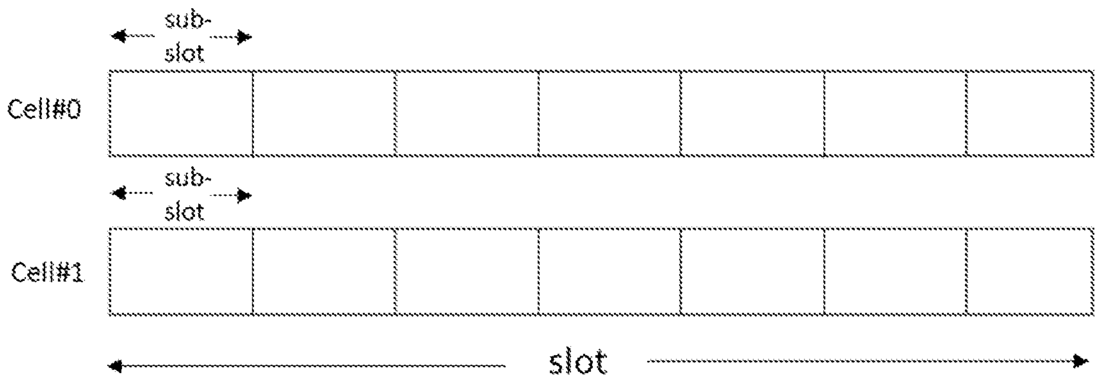
FIG. 6 is a diagram illustrating the same sub-slot configuration being applied to different cells, according to an implementation of the present disclosure.

FIG. 6 is a diagram illustrating the same sub-slot configuration being applied to different cells, according to an implementation of the present disclosure. In some implementations, as shown in FIG. 6, the length of a sub-slot within a slot for the first BWP may be the same as the length of a sub-slot within a slot for the second BWP or all other BWPs. More specifically, the subslotLengthForPUCCH-r16 being set to value 2 refers to 2 symbols per sub-slot and 7 sub-slots per slot.

In some implementations, if the subslotLengthForPUCCH-r16 is absent for the first BWP, the subslotLengthForPUCCH-r16 may not be configured to the second BWP and/or all other BWPs.

2. PUCCH-ConfigurationList: to configure UE specific PUCCH parameters per BWP for two simultaneously constructed HARQ-ACK codebooks.

In some implementations, if the PUCCH-ConfigurationList is not configured to the first BWP, the PUCCH-ConfigurationList may not be configured to the second BWP and/or all other BWPs. More specifically, HARQ-ACK codebook for the indicated PUCCH carrier may correspond to the same priority when the PUCCH-ConfigurationList is absent.

In some implementations, if the PUCCH-ConfigurationList is configured to the first BWP, the PUCCH-ConfigurationList may be configured to the second BWP or all other BWPs.

In some implementations, if a UE is capable of simultaneously generating more than one HARQ-ACK codebook, the more than one HARQ-ACK codebooks may be enabled to transmit on every candidate PUCCH carrier.

3. harq-CodebookID: to configure the priority of SPS PDSCH HARQ-ACK codebook per SPS PDSCH configuration.

In some implementations, if the harq-CodebookID is configured, the corresponding PUCCH for transmission of the SPS HARQ-ACK codebook on each PUCCH carrier may be able to simultaneously generate more than one HARQ-ACK codebook.

In some implementations, if the harq-CodebookID is not configured, the corresponding PUCCH for transmission of the SPS HARQ-ACK codebook on each PUCCH carrier may not be able to simultaneously generate more than one HARQ-ACK codebook.

4. SchedulingRequestResourceConfigExt-v1610—phy-PriorityIndex-r16: to indicate the priority of corresponding SR.

In some implementations, if the phy-PriorityIndex-r16 is configured to the first BWP, the PUCCH for transmission of the SR on each PUCCH carrier may be able to correspond to different priorities. More specifically, the second BWP or all other BWPs may be configured phy-PriorityIndex-r16 as well.

In some implementations, if the phy-PriorityIndex-r16 is not configured to the first BWP, the PUCCH for transmission of the SR on each PUCCH carrier may not be able to correspond to different priorities. More specifically, the phy-PriorityIndex-r16 for the second BWP and/or all other BWPs may be absent.

5. dl-DataToUL-ACK-DCI-1-2-r16

In some implementations, if the dl-DataToUL-ACK-DCI-1-2-r16 is configured to the first BWP, the dl-DataToUL-ACK-DCI-1-2-r16 may be configured to the second BWP, or other BWPs in case there is no corresponding K1 value for the DCI format 1-2.

In some implementations, the K1 value in the sequence dl-DataToUL-ACK-DCI-1-2-r16 may be the same for each PUCCH carrier. More specifically, if the NW includes the dl-DataToUL-ACK-DCI-1-2-r16 for the first BWP, the NW includes the same number of K1 value and listed in the same order, as for the second BWP and/or other BWPs.

6. dl-DataToUL-ACK

In some implementations, the K1 value in the sequence dl-DataToUL-ACK may be the same for each PUCCH carrier.

7. dl-DataToUL-ACK-r16

In some implementations, if the dl-DataToUL-ACK-r16 is configured to the first BWP, the dl-DataToUL-ACK-r16 may be configured to the second BWP, or other BWPs in a case that the indication of non-numerical value is not aligned among different PUCCH carriers.

In some implementations, the K1 value in the sequence dl-DataToUL-ACK-r16 may be the same for each PUCCH carrier.

8. sps-PUCCH-AN-r16, sps-PUCCH-AN-List

In some implementations, if the sps-PUCCH-AN-r16/sps-PUCCH-AN-List is configured to the first BWP, the sps-PUCCH-AN-r16/sps-PUCCH-AN-List may be configured to the second BWP, or other BWPs in case some PUCCH carriers do not support the SPS PDSCH only HARQ-ACK.

In some implementations, if the sps-PUCCH-AN-r16/sps-PUCCH-AN-List is not configured to the first BWP, the sps-PUCCH-AN-r16/sps-PUCCH-AN-List may not be configured to the second BWP, or other BWPs.

9. spatialRelationInfoToAddModListExt, spatialRelationInfoToAddModListSizeExt

In some implementations, if the spatialRelationInfoToAddModListSizeExt or the spatialRelationInfoToAddModListExt is configured to the first BWP, the spatialRelationInfoToAddModListSizeExt or the spatialRelationInfoToAddModListExt may be configured to the second BWP, or other BWPs in a case that inconsistent indication of spatial setting for the PUCCH is configured.

10. PUCCH-FormatConfig: one or more fields included in the PUCCH-Format Config may be consistent for each PUCCH carrier.

In some implementations, the interslotFreqencyHopping may be configured to all configured PUCCH formats for each PUCCH carrier.

In some implementations, the interslotFreqencyHopping may be configured to all PUCCH formats 1, 3, and 4 for each PUCCH carrier.

In some implementations, the interslotFreqencyHopping may be only configured to a specific PUCCH format for each PUCCH carrier. For example, if the interslotFreqencyHopping is configured for the PUCCH format 3 for an initial PUCCH carrier, the interslotFreqencyHopping may be configured for the PUCCH format 3 for a target PUCCH carrier.

In some implementations, the interslotFreqencyHopping may be configured to a different PUCCH format for a different PUCCH carrier. In some examples, if the interslotFreqencyHopping is configured to a first PUCCH format for an initial PUCCH carrier, the interslotFreqencyHopping may be configured to a second PUCCH format for a target PUCCH carrier. Specifically, the first PUCCH format may be different from the second PUCCH format.

In some implementations, the nrofSlots may be only configured to a specific PUCCH format for each PUCCH carrier. For example, if the nrofSlots is configured for the PUCCH format 3 for an initial PUCCH carrier, the nrofSlots may be configured for the PUCCH format 3 for a target PUCCH carrier.

In some implementations, the nrofSlots configured for different PUCCH cells may correspond to the same value. In some implementations, at least one PUCCH format may correspond to the number of repetitions equal to 2 for an initial PUCCH carrier, and at least one PUCCH format may be configured with 2 for a target PUCCH carrier.

In some implementations, the simultaneousHARQ-ACK-CSI may be configured to all configured PUCCH carriers; otherwise, the simultaneousHARQ-ACK-CSI may be absent for each PUCCH carrier.

In some implementations, the simultaneousHARQ-ACK-CSI may be configured specifically to at least one specific PUCCH format for each PUCCH carrier. In some examples, the at least one specific PUCCH format may be the same or different among all configured PUCCH carriers.

With misaligned PUCCH configurations, a UE may perform the following actions.

In some examples, the UE may receive at least one misaligned PUCCH configurations for different PUCCH carriers.

In some examples, the UE may perform the PUCCH carrier switching if at least one misaligned PUCCH configuration is configured to the UE.

In some examples, the UE may perform the PUCCH carrier switching before checking whether the PUCCH configuration configured to an initial PUCCH carrier is the same as that of each candidate PUCCH carrier.

In some examples, the UE may ignore the PUCCH carrier switching indication and determine to transmit the PUCCHs on an initial PUCCH carrier.

In some examples, the UE may conditionally perform the PUCCH carrier switching based on one or more requirements.

In some implementations, the one or more requirements may include the timeline, the number of UCI bits, the SCS configuration, the priority indication, the sub-slot configuration, and the SPS configuration.

Figure 7:
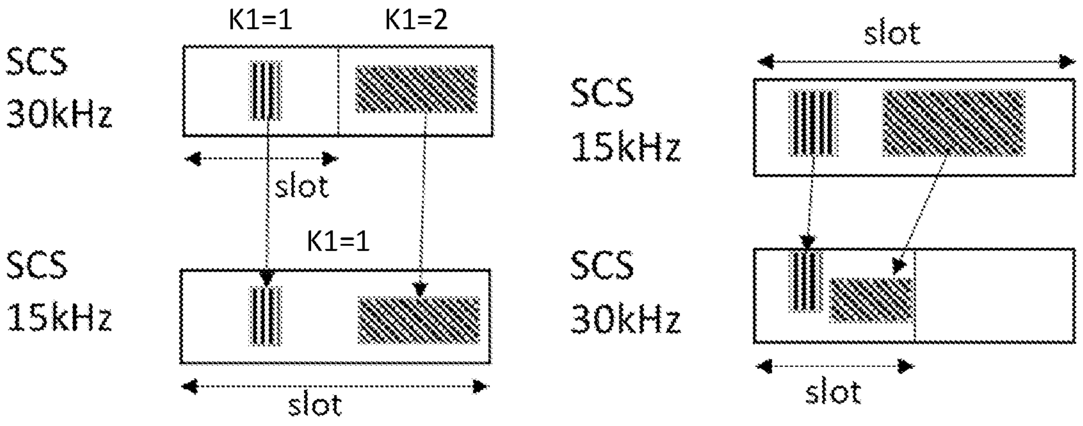
FIG. 7 is a diagram illustrating non-overlapping PUCCHs in an initial PUCCH carrier and a target PUCCH carrier with different SCS configurations, according to an implementation of the present disclosure.

FIG. 7 is a diagram illustrating non-overlapping PUCCHs in an initial PUCCH carrier and a target PUCCH carrier with different SCS configurations, according to an implementation of the present disclosure. As shown in FIG. 7, the non-overlapping PUCCHs within a slot/sub-slot on an initial PUCCH carrier may result in the non-overlapping PUCCHs/PUSCHs within a slot/sub-slot on a target PUCCH carrier due to different slot/sub-slot configurations in the initial PUCCH carrier and the target PUCCH carrier.

In some implementations, the SCS configuration for an initial PUCCH carrier and a target PUCCH carrier may be the same or different.

As shown in FIG. 7, the non-overlapping PUCCHs/PUSCHs within a slot/sub-slot on an initial PUCCH carrier may be expected to be overlapping on a target PUCCH carrier when one or more conditions are satisfied.

In some implementations, the one or more conditions may include a UE capability, a DCI indication, an RRC parameter, an RRC configuration, and a MAC CE indication.

In some implementations, the one or more conditions may include the timeline conditions.

In some implementations, the UE may determine the one or more conditions based on whether UCI multiplexing of different UCI types is enabled, or whether UCI multiplexing of the UCI with different priorities is enabled.

In some implementations, the one or more conditions may include the SCS configuration of each PUCCH carrier. In some implementations, the SCS of an initial PUCCH carrier may be larger than that of a target PUCCH carrier. In some implementations, the SCS of an initial PUCCH carrier may be smaller than that of a target PUCCH carrier. In some implementations, the SCS of an initial PUCCH carrier may be equal to that of a target PUCCH carrier.

In some examples, the priority of the overlapping PUCCHs on an initial PUCCH carrier may be the same as that of a target PUCCH carrier.

In some implementations, the priority of all configured PUCCHs on an initial PUCCH carrier may be the same as that of a target PUCCH carrier.

In some implementations, the priority of configured PUCCHs within a first slot/sub-slot on an initial PUCCH carrier may be the same as that of configured PUCCHs within a second slot/sub-slot overlapping with the first slot/sub-slot.

In some implementations, the priority of overlapping PUCCHs may be the same on an initial PUCCH carrier or a target PUCCH carrier.

Figure 8:
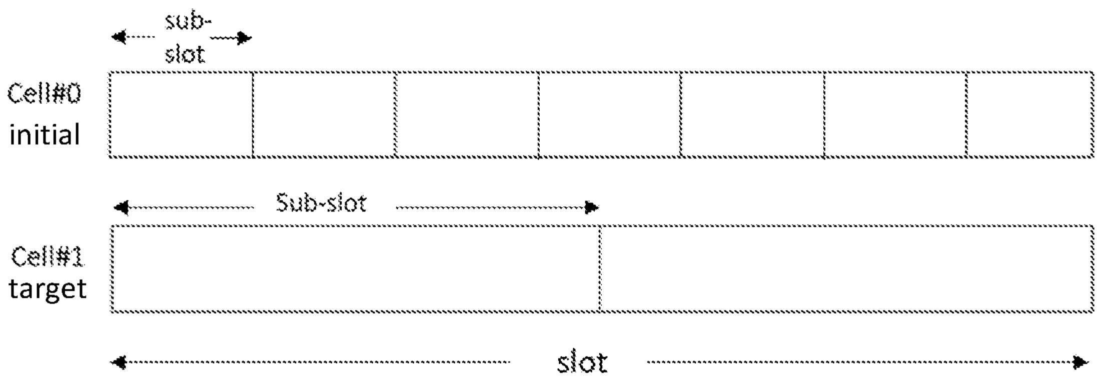
FIG. 8 is a diagram illustrating a smaller sub-slot for an initial PUCCH carrier, according to an implementation of the present disclosure.

FIG. 8 is a diagram illustrating a smaller sub-slot for an initial PUCCH carrier, according to an implementation of the present disclosure. As shown in FIG. 8, the number of symbols per sub-slot configured for an initial PUCCH carrier (e.g., Cell #0) may be lower than that of candidate PUCCH carriers (e.g., a target PUCCH carrier Cell #1).

Figure 9:
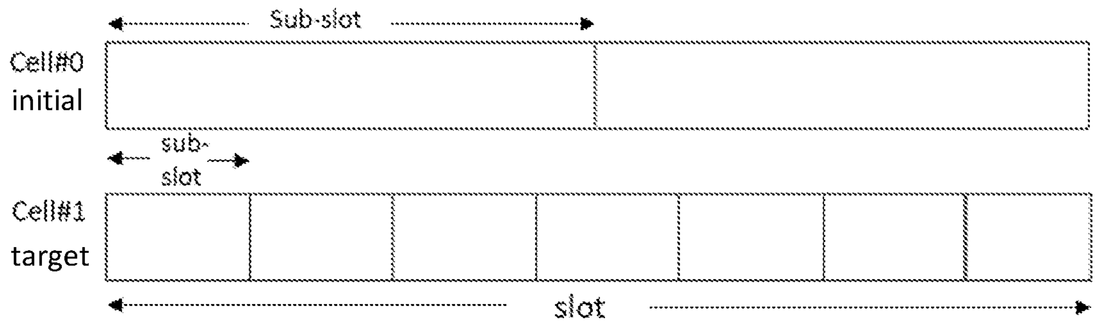
FIG. 9 is a diagram illustrating a larger sub-slot for an initial PUCCH carrier, according to an implementation of the present disclosure.

FIG. 9 is a diagram illustrating a larger sub-slot for an initial PUCCH carrier, according to an implementation of the present disclosure. As shown in FIG. 9, the number of symbols per sub-slot configured for an initial PUCCH carrier (e.g., Cell #0) may be higher than that of candidate PUCCH carriers (e.g., a target PUCCH carrier Cell #1).

In some examples, the UE may determine the PUCCH resource set on a target PUCCH carrier based on a total number of UCI information bits within a slot/sub-slot on an initial PUCCH carrier.

In some implementations, the UCI information may include the same or different UCI types.

In some implementations, the UCI information may correspond to the same or different priority.

In some examples, a first PUCCH on an initial PUCCH carrier may expect to be switched to a second PUCCH or a PUSCH on a target PUCCH carrier that is no later or no earlier than the first PUCCH.

Figure 10:
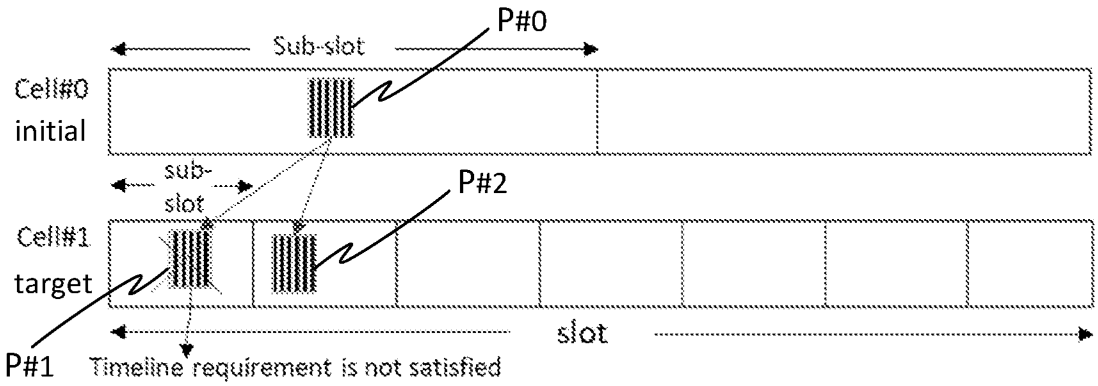
FIG. 10 is a diagram illustrating a PUCCH of a target PUCCH carrier earlier than a PUCCH of an initial PUCCH carrier, according to an implementation of the present disclosure.

FIG. 10 is a diagram illustrating a PUCCH of a target PUCCH carrier earlier than a PUCCH of an initial PUCCH carrier, according to an implementation of the present disclosure. In some implementations, the PUCCH P #1 transmitted on the target PUCCH carrier (e.g., Cell #1) is earlier than the PUCCH P #0 transmitted on the initial PUCCH carrier (e.g., Cell #0) and hence the PUCCH may not be transmitted by using PUCCH P #1 on Cell #1. In some implementations, PUCCH P #2 or the PUSCH that is transmitted on the target PUCCH carrier (e.g., Cell #1) may start from the first symbol/sub-slot/slot that satisfies timeline requirements (e.g., not earlier than the PUCCH P #0 that is transmitted on the initial PUCCH carrier (e.g., Cell #0)).

In some implementations, the PUCCH (e.g., P #2) of a high priority (e.g., having index 1) may start from a symbol that is no later than the PUCCH (e.g., P #0) or the PUCCH (e.g., P #2) of a low priority (e.g., index 0) may start from a symbol that is not earlier than the PUCCH (e.g., P #0).

Figure 11:
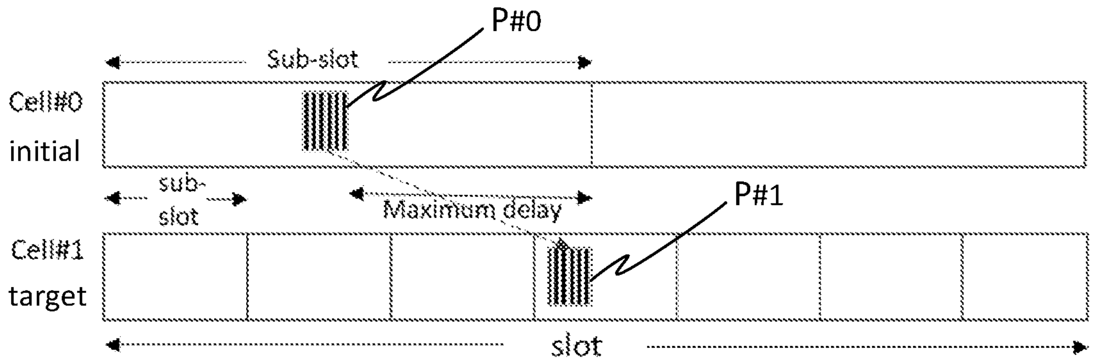
FIG. 11 is a diagram illustrating a PUCCH of a target PUCCH carrier later than a PUCCH of an initial PUCCH carrier, according to an implementation of the present disclosure.

FIG. 11 is a diagram illustrating a PUCCH of a target PUCCH carrier later than a PUCCH of an initial PUCCH carrier, according to an implementation of the present disclosure. In some implementations, if the PUCCH P #1 transmitted on the target PUCCH carrier (e.g., in Cell #1) or the PUSCH is later than the PUCCH P #0 transmitted on the initial PUCCH carrier (e.g., in Cell #0) in the time domain, a maximum value to delay the PUCCH transmission may be determined or indicated. For example, the PUCCH P #1 or the PUSCH may not be later than x symbols (e.g., maximum delay) starting from the end of the PUCCH P #0. In some implementations, the value may be based on the end of the slot where the PUCCH P #0 is configured. In some implementations, the value may be in symbol, sub-slot, and/or slot unit.

In some implementations, if the PUCCH P #1 or the PUSCH is later than the PUCCH P #0 in time domain, a maximum value to delay the transmission may be determined or indicated. For example, the second PUCCH P #1 or the PUSCH may not be later than x symbols starting from the start of the first PUCCH P #0.

If the PUCCH carrier switching is indicated, more than one PUCCH configurations are configured to a UE, and misaligned PUCCH configurations between an initial carrier and a target PUCCH carrier exist, the UE may use at least one offset value to adjust PUCCH differences on different PUCCH carriers. In some implementations, PUCCH differences may include the PUCCH corresponding to different slot/sub-slot for an initial PUCCH carrier and target PUCCH carrier. In some implementations, PUCCH differences may include different overlapping situation. In some implementations, PUCCH differences may include different priority indication. In some implementations, PUCCH differences may include the support of SPS only HARQ-ACK codebook.

In some implementations, the offset may apply to K1, DCI indicating PUCCH resource, SR periodicity, CSI periodicity, and/or DCI scheduling a PUSCH.

In some implementations, the offset may be indicated in DCI or configured in higher layer configuration.

In some implementations, the granularity of the offset may be determined by a target PUCCH carrier or an initial PUCCH carrier.

In some examples, some offset values may be used to determine PUCCH resource set for a target PUCCH carrier.

In some implementations, the offset value may include the number of reserved bits.

In some implementations, the offset may be determined by the UE based on whether SCS configurations are different between an initial PUCCH carrier and a target PUCCH carrier.

In some implementations, the offset may be added to the threshold for determining PUCCH resource set.

In some examples, if sps-PUCCH-AN-r16 is not included in one of PUCCH-Config, more than one SPS HARQ-ACK information bits may be appended to HARQ-ACK information bits for a PDSCH reception. More specifically, if a HARQ-ACK codebook only for a SPS PDSCH is not allowed to generate for a carrier, the HARQ-ACK information bits in response to SPS PDSCH may be appended to HARQ-ACK for a PDSCH reception.

In some implementations, the SPS HARQ-ACK information bits may include HARQ-ACK in response to SPS PDSCH, HARQ-ACK corresponding to the SPS release DCI, or HARQ-ACK corresponding to the first SPS PDSCH activated by Activation DCI.

In some examples, some configured PUCCH parameters/configurations may be dynamically changed.

In some implementations, the length of a sub-slot may be indicated by DCI or MAC CE.

In some implementations, repetition factor for each PUCCH format may be dynamically indicated/activated.

In some implementations, which PUCCH format is used by the UE to perform a PUCCH repetition may be dynamically changed.

In some examples, if more than K1 sets (e.g., dl-DataToUL-ACK, dl-DataToUL-ACK-DCI-1-2-r16, dl-DataToUL-ACK-r16) are configured and different number of K1 is included in a set, the number of bits to indicate K1 value may include a set with the maximum number of K1. For example, if the size of sequence for dl-DataToUL-ACK is 8 for an initial PUCCH carrier and the size of sequence for dl-DataToUL-ACK is 4 for a target PUCCH carrier, the number of bits in DCI field to indicate K1 may be based on 8.

FIG. 12 is a flowchart illustrating a method/process 1200 for performing PUCCH transmission, according to an implementation of the present disclosure. In action 1202, the UE receives, from a BS, multiple PUCCH configurations for multiple cells, a first PUCCH configuration of the plurality of PUCCH configurations including one or more first spatial relation information for a first cell of the plurality of cells, and a second PUCCH configuration of the plurality of PUCCH configurations including one or more second spatial relation information for a second cell of the plurality of cells. In action 1204, the UE receives, from the BS on a PDSCH, an activation message for activating at least one first spatial relation information of the one or more first spatial relation information for the first cell or at least one second spatial relation information of the one or more second spatial relation information for the second cell. In action 1206, the UE performs a first PUCCH transmission on the first cell by using a first spatial setting corresponding to the at least one first spatial relation information indicated in the activation message.

In some implementations, the one or more first spatial relation information and the one or more second spatial relation information correspond to at least one index indicated in the plurality of PUCCH configurations.

In some implementations, the UE further performs a PUCCH cell switching from the first cell to the second cell in a case that the UE receives a PUCCH cell switching indication from the BS. In some implementations, the UE further performs a second PUCCH transmission on the second cell by using a second spatial setting corresponding to the at least one second spatial relation information in a case that the at least one second spatial relation information is indicated in the activation message.

In some implementations, the first PUCCH transmission is transmitted on a first BWP and the second PUCCH transmission is transmitted on a second BWP.

In some implementations, the first BWP is associated with a first SCS configuration and the second BWP is associated with a second SCS configuration.

In some implementations, the UE further applies the at least one first spatial relation information for the second PUCCH transmission in a case that the at least one second spatial relation information is not indicated in the activation message.

In some implementations, the activation message corresponds to a MAC CE.

In some implementations, the activation message indicates a first cell ID for the first cell and a first ID of the first spatial relation information that is associated with the first cell ID, or a second cell ID for the second cell and a second ID of the second spatial relation information that is associated with the second cell ID.

In some implementations, in a case that the first cell and the second cell belong to a same group, the first ID is equal to the second ID.

In some implementations, the activation message includes a first field for the first cell and a second field for the second cell.

Figure 13:
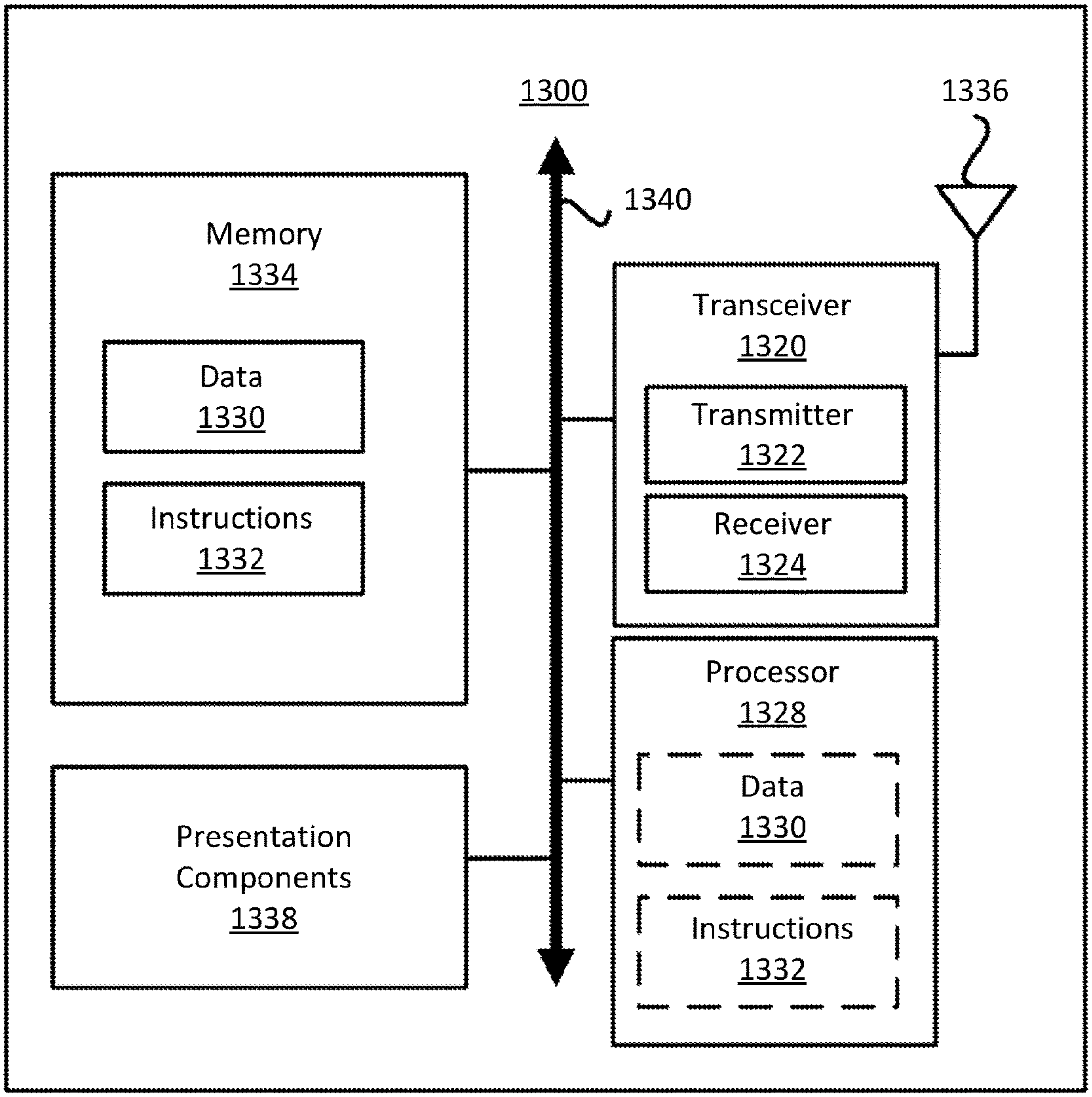
FIG. 13 is a block diagram illustrating a node for wireless communication, according to an implementation of the present disclosure.

FIG. 13 is a block diagram illustrating a node 1300 for wireless communication, according to an implementation of the present disclosure.

As illustrated in FIG. 13, the node 1300 may include a transceiver 1320, a processor 1328, a memory 1334, one or more presentation components 1338, and at least one antenna 1336. The node 1300 may also include a Radio Frequency (RF) spectrum band module, a BS communications module, a network communications module, a system communications management module, input/output (I/O) ports, I/O components, and a power supply (not illustrated in FIG. 13).

Each of these components may be in communication with each other, directly or indirectly, over one or more buses 1340. The node 1300 may be a UE or a BS that performs various disclosed functions illustrated in FIG. 12 and examples/implementations in this disclosure.

The transceiver 1320 may include a transmitter 1322 (with transmitting circuitry) and a receiver 1324 (with receiving circuitry) and may be configured to transmit and/or receive time and/or frequency resource partitioning information. The transceiver 1320 may be configured to transmit in different types of subframes and slots including, but not limited to, usable, non-usable, and flexibly usable subframes and slot formats. The transceiver 1320 may be configured to receive data and control channels.

The node 1300 may include a variety of computer-readable media. Computer-readable media may be any media that may be accessed by the node 1300 and include both volatile (and non-volatile) media and removable (and non-removable) media. Computer-readable media may include computer storage media and communication media. Computer storage media may include both volatile (and/or non-volatile), as well as removable (and/or non-removable), media implemented according to any method or technology for storage of information such as computer-readable media.

Computer storage media may include RAM, ROM, EPROM, EEPROM, flash memory (or other memory technology), CD-ROM, Digital Versatile Disk (DVD) (or other optical disk storage), magnetic cassettes, magnetic tape, magnetic disk storage (or other magnetic storage devices), etc. Computer storage media do not include a propagated data signal.

Communication media may typically embody computer-readable instructions, data structures, program modules, or other data in a modulated data signal, such as a carrier wave, or other transport mechanisms and include any information delivery media. The term “modulated data signal” may mean a signal that has one or more of its characteristics set or changed in such a manner as to encode information in the signal. Communication media may include wired media, such as a wired network or direct-wired connection, and wireless media, such as acoustic, RF, infrared, and other wireless media. Combinations of any of the disclosed media should be included within the scope of computer-readable media.

The memory 1334 may include computer-storage media in the form of volatile and/or non-volatile memory. The memory 1334 may be removable, non-removable, or a combination thereof. For example, the memory 1334 may include solid-state memory, hard drives, optical-disc drives, etc. As illustrated in FIG. 13, the memory 1334 may store computer-readable and/or computer-executable instructions 1332 (e.g., software codes) that are configured to, when executed, cause the processor 1328 (e.g., processing circuitry) to perform various disclosed functions. Alternatively, the instructions 1332 may not be directly executable by the processor 1328 but may be configured to cause the node 1300 (e.g., when compiled and executed) to perform various disclosed functions.

The processor 1328 may include an intelligent hardware device, a central processing unit (CPU), a microcontroller, an ASIC, etc. The processor 1328 may include memory. The processor 1328 may process the data 1330 and the instructions 1332 received from the memory 1334, and information received through the transceiver 1320, the baseband communications module, and/or the network communications module. The processor 1326 may also process information sent to the transceiver 1320 for transmission via the antenna 1336, and/or to the network communications module for transmission to a CN.

One or more presentation components 1338 may present data to a person or other devices. Presentation components 1338 may include a display device, a speaker, a printing component, a vibrating component, etc.

From the present disclosure, it is evident that various techniques may be utilized for implementing the disclosed concepts without departing from the scope of those concepts. Moreover, while the concepts have been disclosed with specific reference to specific implementations, a person of ordinary skill in the art would recognize that changes may be made in form and detail without departing from the scope of those concepts. As such, the present disclosure is to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method for physical uplink control channel (PUCCH) transmission performed by a user equipment (UE), the method comprising:

receiving, from a base station (BS), a plurality of PUCCH configurations for a plurality of cells, a first PUCCH configuration of the plurality of PUCCH configurations including one or more first spatial relation information for a first cell of the plurality of cells, and a second PUCCH configuration of the plurality of PUCCH configurations including one or more second spatial relation information for a second cell of the plurality of cells;

receiving, from the BS, a first activation message for activating at least one first spatial relation information of the one or more first spatial relation information for the first cell and a second activation message for activating at least one second spatial relation information of the one or more second spatial relation information for the second cell;

performing a first PUCCH transmission on the first cell by using a first spatial setting corresponding to the at least one first spatial relation information indicated in the first activation message;

performing a PUCCH cell switching from the first cell to the second cell in response to receiving a PUCCH cell switching indication from the BS; and performing a second PUCCH transmission on the second cell by using a second spatial setting corresponding to the at least one second spatial relation information indicated in the second activation message.

2. The method of claim 1, wherein the one or more first spatial relation information and the one or more second spatial relation information correspond to at least one index indicated in the plurality of PUCCH configurations.

3. The method of claim 1, wherein:

the first PUCCH transmission is transmitted on a first BandWidth Part (BWP), and the second PUCCH transmission is transmitted on a second BWP.

4. The method of claim 3, wherein:

the first BWP is associated with a first Subcarrier Spacing (SCS) configuration, and the second BWP is associated with a second SCS configuration.

5. The method of claim 1, wherein:

the first activation message corresponds to a first Medium Access Control (MAC) Control Element (CE), and the second activation message corresponds to a second MAC CE.

6. The method of claim 1, wherein:

the first activation message indicates a first cell identity (ID) for the first cell and a first ID of the at least one first spatial relation information that is associated with the first cell ID, and the second activation message indicates a second cell ID for the second cell and a second ID of the at least one second spatial relation information that is associated with the second cell ID.

7. The method of claim 6, wherein, in a case that the first cell and the second cell belong to a same cell group, the first ID is the same as the second ID.

8. The method of claim 1, wherein:

the first activation message includes a first field for the first cell, and the second activation message includes a second field for the second cell.

9. A user equipment (UE) for performing physical uplink control channel (PUCCH) transmission, the UE comprising:

at least one processor; and at least one non-transitory computer-readable medium coupled to the at least one processor and storing one or more computer-executable instructions that, when executed by the at least one processor, cause the UE to:

receive, from a base station (BS), a plurality of PUCCH configurations for a plurality of cells, a first PUCCH configuration of the plurality of PUCCH configurations including one or more first spatial relation information for a first cell of the plurality of cells, and a second PUCCH configuration of the plurality of PUCCH configurations including one or more second spatial relation information for a second cell of the plurality of cells;

receive, from the BS, a first activation message for activating at least one first spatial relation information of the one or more first spatial relation information for the first cell and a second activation message for activating at least one second spatial relation information of the one or more second spatial relation information for the second cell;

perform a first PUCCH transmission on the first cell by using a first spatial setting corresponding to the at least one first spatial relation information indicated in the first activation message;

perform a PUCCH cell switching from the first cell to the second cell in response to receiving a PUCCH cell switching indication from the BS; and perform a second PUCCH transmission on the second cell by using a second spatial setting corresponding to the at least one second spatial relation information indicated in the second activation message.

10. The UE of claim 9, wherein the one or more first spatial relation information and the one or more second spatial relation information correspond to at least one index indicated in the plurality of PUCCH configurations.

11. The UE of claim 9, wherein:

the first PUCCH transmission is transmitted on a first BandWidth Part (BWP), and the second PUCCH transmission is transmitted on a second BWP.

12. The UE of claim 11, wherein:

the first BWP is associated with a first Subcarrier Spacing (SCS) configuration, and the second BWP is associated with a second SCS configuration.

13. The UE of claim 9, wherein:

the first activation message corresponds to a first Medium Access Control (MAC) Control Element (CE), and the second activation message corresponds to a second MAC CE.

14. The UE of claim 9, wherein:

the first activation message indicates a first cell identity (ID) for the first cell and a first ID of the at least one first spatial relation information that is associated with the first cell ID, and the second activation message indicates a second cell ID for the second cell and a second ID of the at least one second spatial relation information that is associated with the second cell ID.

15. The UE of claim 14, wherein, in a case that the first cell and the second cell belong to a same cell group, the first ID is the same as the second ID.

16. The UE of claim 9, wherein:

the first activation message includes a first field for the first cell, and the second activation message includes a second field for the second cell.

* * * * *